US009536443B2

(12) United States Patent
Haverlock et al.

(10) Patent No.: US 9,536,443 B2
(45) Date of Patent: Jan. 3, 2017

(54) EVALUATING EXPERT OPINIONS IN A QUESTION AND ANSWER SYSTEM

(71) Applicant: International Business Machines Corporation, Armonk, NY (US)

(72) Inventors: Kevin B. Haverlock, Cary, NC (US); Stephan J. Roorda, Fuquay-Varina, NC (US); Michael D. Whitley, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 14/262,928

(22) Filed: Apr. 28, 2014

(65) Prior Publication Data

US 2015/0310755 A1    Oct. 29, 2015

(51) Int. Cl.
  *G09B 7/00*   (2006.01)
  *G09B 7/02*   (2006.01)
  *G09B 5/00*   (2006.01)
  *H04L 29/08*  (2006.01)

(52) U.S. Cl.
  CPC . *G09B 7/02* (2013.01); *G09B 5/00* (2013.01); *H04L 67/10* (2013.01)

(58) Field of Classification Search
  CPC ............... G06F 17/30675; G06F 17/30864; G06F 17/30979; G09B 7/02; G09B 7/00; G09B 5/00; Y10S 707/99931
  USPC ........................................ 434/322, 323, 350
  See application file for complete search history.

(56) References Cited

U.S. PATENT DOCUMENTS

| 8,005,775 | B2 | 8/2011 | Bridgewater et al. |
| 8,260,789 | B2 | 9/2012 | Dumais et al. |
| 8,266,098 | B2 | 9/2012 | Hu et al. |
| 8,463,673 | B2 | 6/2013 | Koll et al. |
| 2003/0028525 | A1 | 2/2003 | Meyers et al. |
| 2009/0287678 | A1* | 11/2009 | Brown .............. G06F 17/30654 |
| 2011/0125734 | A1* | 5/2011 | Duboue .................... G09B 7/00 707/723 |
| 2012/0041950 | A1 | 2/2012 | Koll et al. |
| 2012/0077178 | A1* | 3/2012 | Bagchi ..................... G09B 7/00 434/362 |

(Continued)

OTHER PUBLICATIONS

Haverlock et al., "Evaluating Expert Opinions in a Question and Answer System," U.S. Appl. No. 15/057,578, filed Mar. 1, 2016, 38 pages.

(Continued)

*Primary Examiner* — Robert J Utama
*Assistant Examiner* — Jerry-Daryl Fletcher
(74) *Attorney, Agent, or Firm* — Van Leeuwen & Van Leeuwen; Reza Sarbakhsh (57) ABSTRACT

An approach is provided for evaluating subject matter experts (SMEs) in a question and answering (QA) system. In the approach, a number of responses are received at the QA system with each of the responses being a response to a common question and each of the responses being received from a SME. One of the responses is selected with the selected response being from one of the SMEs that is being evaluated. The approach evaluates the selected response by comparing the selected response to the responses received from the other SMEs. Based on the evaluation, the approach updates a SME confidence score that corresponds to the selected SME.

8 Claims, 8 Drawing Sheets

(56) References Cited

U.S. PATENT DOCUMENTS

| | | | |
|---|---|---|---|
| 2012/0078902 A1* | 3/2012 | Duboue | G06F 17/30675 707/736 |
| 2012/0084293 A1* | 4/2012 | Brown | A61B 5/00 707/741 |
| 2013/0282363 A1* | 10/2013 | Fan | G09B 7/00 704/9 |
| 2014/0272904 A1* | 9/2014 | Bagchi | G09B 7/02 434/362 |
| 2014/0272909 A1* | 9/2014 | Isensee | G09B 7/02 434/362 |

OTHER PUBLICATIONS

"List of IBM Patents or Patent Applications Treated as Related," Letter from Leslie A. Van Leeuwen, Mar. 1, 2016, 1 page.

* cited by examiner

EVALUATING EXPERT OPINIONS IN A QUESTION AND ANSWER SYSTEM

BACKGROUND OF THE INVENTION

A Question/Answer System, such as the IBM Watson™ system is an artificially intelligent computer system capable of answering questions posed in natural language. One aspect in a QA system is passage support and identifying passages that are relevant to an answer. This aspect is important both from an algorithm standpoint and also to instill confidence in the QA system's answers displayed to the user. One way a QA system identifies relevant passages is based on NLP algorithms. Input to the NLP algorithm is an answer key such that given the Question and Answer—Is the passage relevant? One current way of selecting relevant passages is by using screened Subject Matter Experts (SMEs). The SMEs are people that evaluate a passage and identify whether it provides supporting evidence for the answer. Their feedback is used to produce the answer key and, hopefully, better passage results. This takes time, effort, and investment in the SMEs. Additionally, the involvement of the SMEs occurs primarily during the training and test phase. Once in production, the opportunity to receive value judgments on passages traditionally becomes less controlled. Once the passage is identified as being relevant, it is scored by the QA system. Traditional QA system scoring of a relative passage is somewhat primitive. Within the NLP Scorers, one looks at the Question (Q), the Answer (A), and the passage (P) which was pulled to support the given answer. The passage match is based on similar words, e.g., did the system find that a passage with "George Washington was an American" matched against the Question "Who was the first American President?" In this example, the passage that it was scoring obviously would not completely justify an answer of George Washington for the above Question, but the NLP scorers might have liked it due to the location of 'American'. Current solutions for scoring the passage relevance asks the user to "rate" the passage as it relates to the question and answer, but ignore the question of whether the SME's judgment should be accepted or if the SME is providing bad data that can poison the QA system's identification of relevant passages given the question and the resulting answer. A further challenge is that the passage ratings are currently not reflected back into the learning algorithm which prevents the QA system from becoming more adept at scoring passages.

SUMMARY

An approach is provided for evaluating subject matter experts (SMEs) in a question and answering (QA) system. In the approach, a number of responses are received at the QA system with each of the responses being a response to a common question and each of the responses being received from a SME. One of the responses is selected with the selected response being from one of the SMEs that is being evaluated. The approach evaluates the selected response by comparing the selected response to the responses received from the other SMEs. Based on the evaluation, the approach updates a SME confidence score that corresponds to the selected SME.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
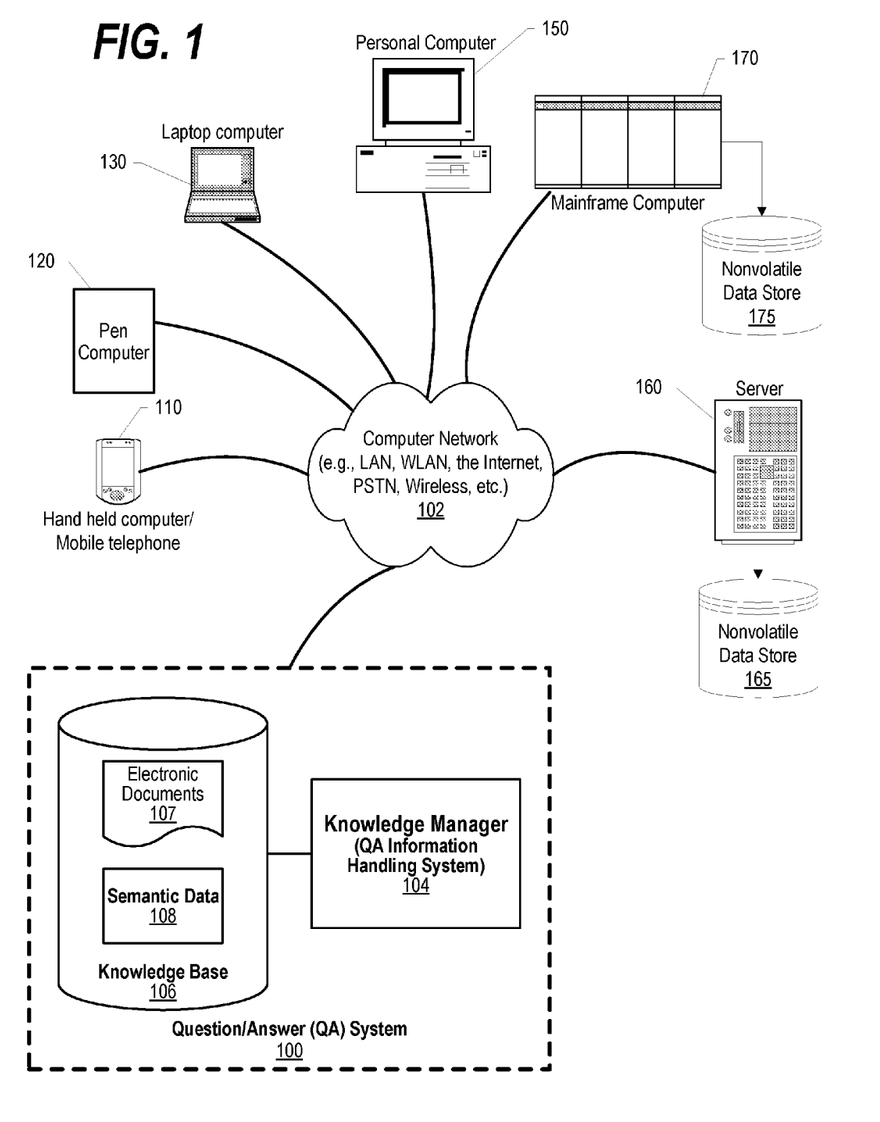
FIG. 1 depicts a network environment that includes a knowledge manager that utilizes a knowledge base.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
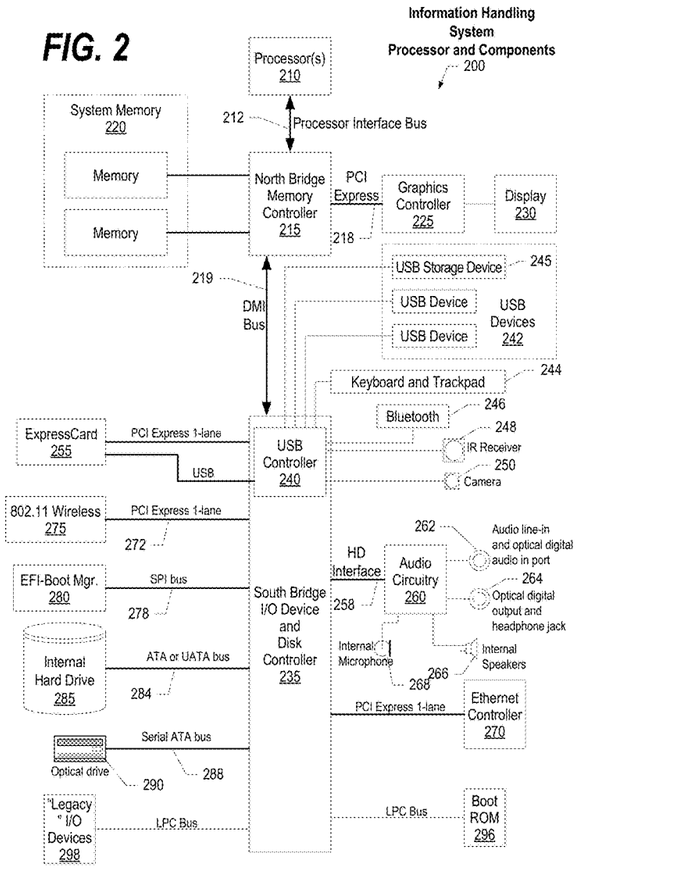
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system, to evaluate Subject Matter Experts (SMEs) in a Question/Answer (QA) system, such as QA System 100 shown in FIG. 1. An approach is provided to, given a database of Q,A,P (question, answer, passage) triplets, provide an evaluation (e.g., justifying or not justifying, etc.) out of some population of SMEs while minimizing the risk of poisoning the results, all the while leveraging crowd sourcing to obtain relevant answers. The approach starts with a "ground truth" set of SMEs and passages. New, 'potential' SMEs are evaluated by the system and associated with a ground truth cluster based on their similarity in a select set of attributes. Once the potential SME has been associated with a cluster, the new SME is asked to evaluate the same set of ground truth passages that the ground truth SMEs evaluated along with a set of passages from the system that were not part of the ground truth set. The results from the ground truth set are compared to the SMEs results and a confidence value (relative to the other SMEs) is calculated. This confidence value is then used to calculate a justifying passage score for the Question/Answer/Passage triplets for all passages evaluated by the SMEs. These scores are then used in the answer key which is used to train the model. This approach allows the QA system to continually and autonomously evaluate passages and experts during all phases, rather than just during the teaching and training phases. Results are fed back into the learning algorithm allowing the QA system to improve its scoring of future passages.

Figure 3:
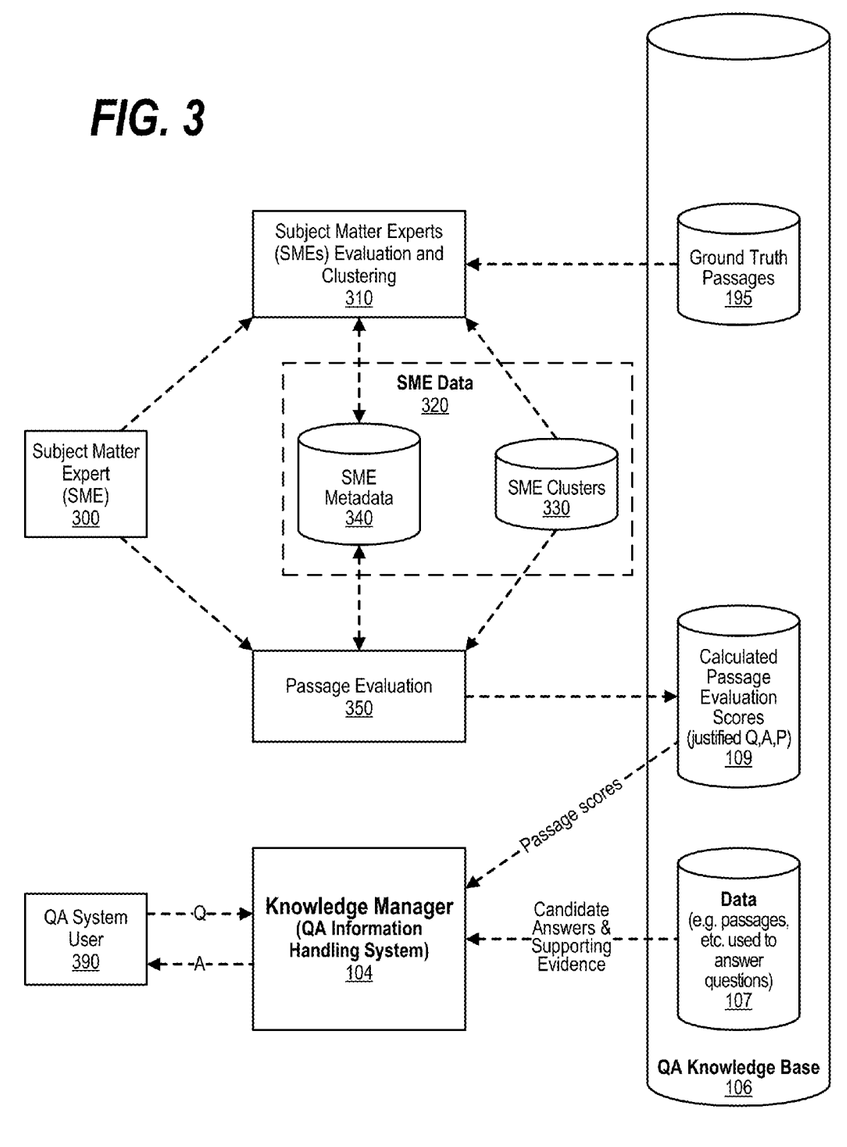
FIG. 3 is a component diagram depicting the various components in autonomous improvement of justifying passage confidence using known and unknown Subject Matter Experts (SMEs)

FIG. 3 is a component diagram depicting the various components in autonomous improvement of justifying passage confidence using known and unknown Subject Matter Experts (SMEs). SME 300 is a subject matter expert in a particular area, such as a particular field of science or technology. Process 310 is used to evaluate SME 300 as well as associate the SME with a particular cluster of SMEs. Evaluation of SMEs utilizes Ground Truth Passages that are stored in data store 195. Ground Truth Passages are passages that are already known, or confirmed, as being relevant to a particular passage. In one embodiment, data store 195 is included in QA Knowledge Base 106, while in other embodiments, the Ground Truth Passages may be maintained separately from the QA Knowledge Base.

SME Data 320 is data pertaining to the various SMEs known to the system. SME Clusters data is stored in 330 and is used to group SMEs into various clusters, such as expertise in a particular field of science or technology. SME Metadata is stored in data store 340 and is data pertaining to individual SMEs. SME Metadata includes data such as an SME's name, contact information (e.g., email address, etc.), user identifier or name used with the QA system when providing evaluations of passages, education, fields of study, experience, etc.). In addition, once evaluated, the SME Metadata also includes the SME Confidence Score pertaining to the SME. As explained in further detail below, the SME Confidence Score is a score based on evaluation of the SME's responses to the responses to other SMEs as well as by comparing the SME's responses to known "truths" embodied in Ground Truth Passages (found in data store 195). SME Data 320 may be included in QA Knowledge Base 106.

Passage Evaluation process 350 is a process in which SME's evaluate passages. In one embodiment, the evaluation process provides a question, an answer, and a passage and the SME's provide a response indicating whether the passage is relevant or not relevant given the question and the answer. In a further embodiment, if an SME is not confident regarding the passage relevancy, the SME can indicate that they are not sure or do not know whether the passage is relevant. The responses provided by SMEs during Passage Evaluation are used to form Calculated Passage Evaluation Scores, which are justified question/answer/passage (Q/A/P) triplets which are stored in data store 109.

QA System 104 utilizes Calculated Passage Evaluation Scores from data store 109 in order to answer questions posed by QA System User 390. QA System 104 receives candidate answers and supporting evidence from data 107 which includes passages used to answer various questions. These candidate answers and supporting evidence are processed in light of passage scores (justified question/answer/passage) triplets from data store 109. Given a question posed by the user, the QA System identifies candidate answers with the candidate answer having supporting evidence. If passages used to identify a candidate answer were found to be "relevant" to the question/answer pair, then the corresponding candidate answer would be weighted more heavily. Conversely, if passages used to identify a candidate answer were found to be "not relevant" to the question/answer pair, then the corresponding candidate answer would have a lower weight or be removed from consideration entirely.

Figure 4:
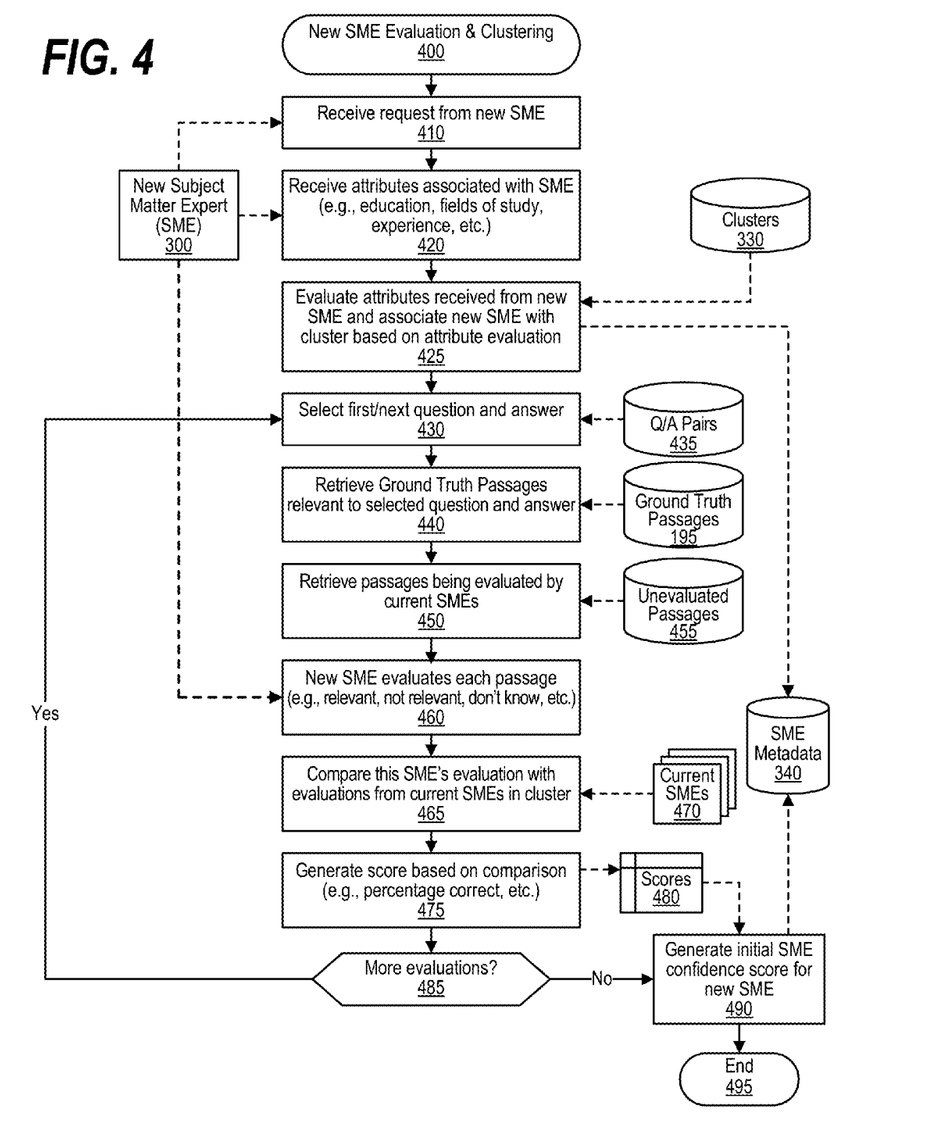
FIG. 4 is a depiction of a flowchart showing the logic used in evaluation of new Subject Matter Experts (SMEs) and clustering SMEs into subject matter clusters.

FIG. 4 is a depiction of a flowchart showing the logic used in evaluation of new Subject Matter Experts (SMEs) and clustering SMEs into subject matter clusters. Processing commences at 400 whereupon, at step 410, a request is received from a new SME (SME 300) who desires to be a subject matter expert in a particular field or area. At step 420, attributes are received from the new SME such as the new SME's education, field(s) of study, experience, and the like. At step 425, the process evaluates the new SME's attributes by comparing the new SME's attributes to attributes of other SMEs. In one embodiment, SMEs are clustered into various clusters. The granularity of the clusters can be broad or narrow depending on the application. For example, broadly defined clusters might be "engineering," "management," "construction," and the like. More narrowly defined clusters might break down the broad clusters into more fine-tuned clusters, such as "mechanical engineering," "electrical engineering," "chemical engineering," and the like for those SMEs that are engineers. Further granularity can be defined within the various disciplines or fields of study. Clusters used by the QA system are defined and stored in data store 330. The result of step 425 is the identification of one or more clusters to which the new SME is associated based on the SME's attributes. The SME's attributes, as well as the identified cluster or clusters, are stored as SME metadata in data store 340. In one embodiment, to evaluate the new SME, a series of question/answer pairs are used in conjunction with various passages (e.g., documents, texts, etc.) that are evaluated by the SMEs.

At step 430, the process selects the first question/answer pair from data store 435. At step 440, the process retrieves one or more Ground Truth Passages that are relevant to the selected question/answer pair. The Ground Truth Passages are those passages previously vetted and known to be relevant to the selected question/answer pair. These Ground Truth Passages are retrieved from data store 195. At step 450, the process retrieves previously unevaluated passages that are currently being evaluated by current SMEs, with each of the current SMEs having already been evaluated by the system and assigned an SME confidence score. The unevaluated passages are retrieved from data store 455.

At step 460, the process receives a set of one or more evaluations from the new SME who is being evaluated. Each of the evaluations received from the new SME pertains to one of the passages (either a Ground Truth Passage or a previously unevaluated passage). In one embodiment, the evaluation of a passage indicates whether the SME felt that the passage was relevant to the question/answer pair, was not relevant to the question/answer pair, or that the SME is unclear and did not know whether the passage was relevant to the question/answer pair.

At step 465, the process compares the new SME's evaluations of the passages with evaluations received by the system from current SMEs 470 in the cluster. For example, the new SME might have indicated that the passage was relevant to the question/answer pair, with the vast majority of SMEs agreeing that the passage was relevant, thus strengthening the system's confidence in the new SME's ability to properly evaluate passages. Conversely, the new SME might have indicated that the passage was not relevant to the question/answer pair, while the vast majority of SMEs indicated that the passage was relevant, thus weakening the system's confidence in the new SME's ability to correctly evaluate passages. For Ground Truth Passages, the relevance of the passage has been previously established. If the new SME indicates that a Ground Truth Passage is relevant, the SME's evaluation will serve to increase the SME confidence score pertaining to the SME. Conversely, if the new SME indicates that a Ground Truth Passage is not relevant to the question/answer pair, the SME's evaluation will serve to decrease the SME confidence score pertaining to the SME. In addition, in one embodiment, if the new SME is unsure of the relevance by indicating that he does not know the relevance, such lack of knowledge may be used to lower the SME's score. At step 475, the process generates a score based on the comparison of the new SME's evaluation to the current SME's evaluation of a previously unevaluated passage or to an absolute relevance of a Ground Truth Passage. This score is stored in memory area 480. For example, a correct evaluation might receive ten points (+10), an incorrect evaluation might receive negative ten points (−10), and an unsure response where the new SME indicated that he did not know whether the passage was relevant might receive negative five points (−5).

A determination is made as to whether there are more question/answer pairs to evaluate before generating an initial SME confidence score for the new SME (decision 485). If there are more question/answer pairs to evaluate, then decision 485 branches to the "yes" branch whereupon processing loops back to step 430 to select the next question/answer pair and receive the new SME's evaluations of passage(s) pertaining to the newly selected question/answer pair with scores for these evaluations being generated and stored in memory area 480. This looping continues until there are no more question/answer pairs to evaluate before generating an initial SME confidence score for the new SME, at which point decision 485 branches to the "no" branch. At step 490, the process generates an initial SME confidence score for the new SME which is stored as metadata pertaining to the new SME in data store 340. In one embodiment, an average of the scores stored in memory area 480 is calculated. Other embodiments may provide greater weight for evaluations pertaining to Ground Truth Passages. Using the scoring system outlined above, if the new SME's confidence score is near ten (e.g., 9.9, etc.), the system has a higher confidence in the new SME's evaluations of passages as compared to an SME with a lower confidence score. Processing thereafter ends at 495.

Figure 5:
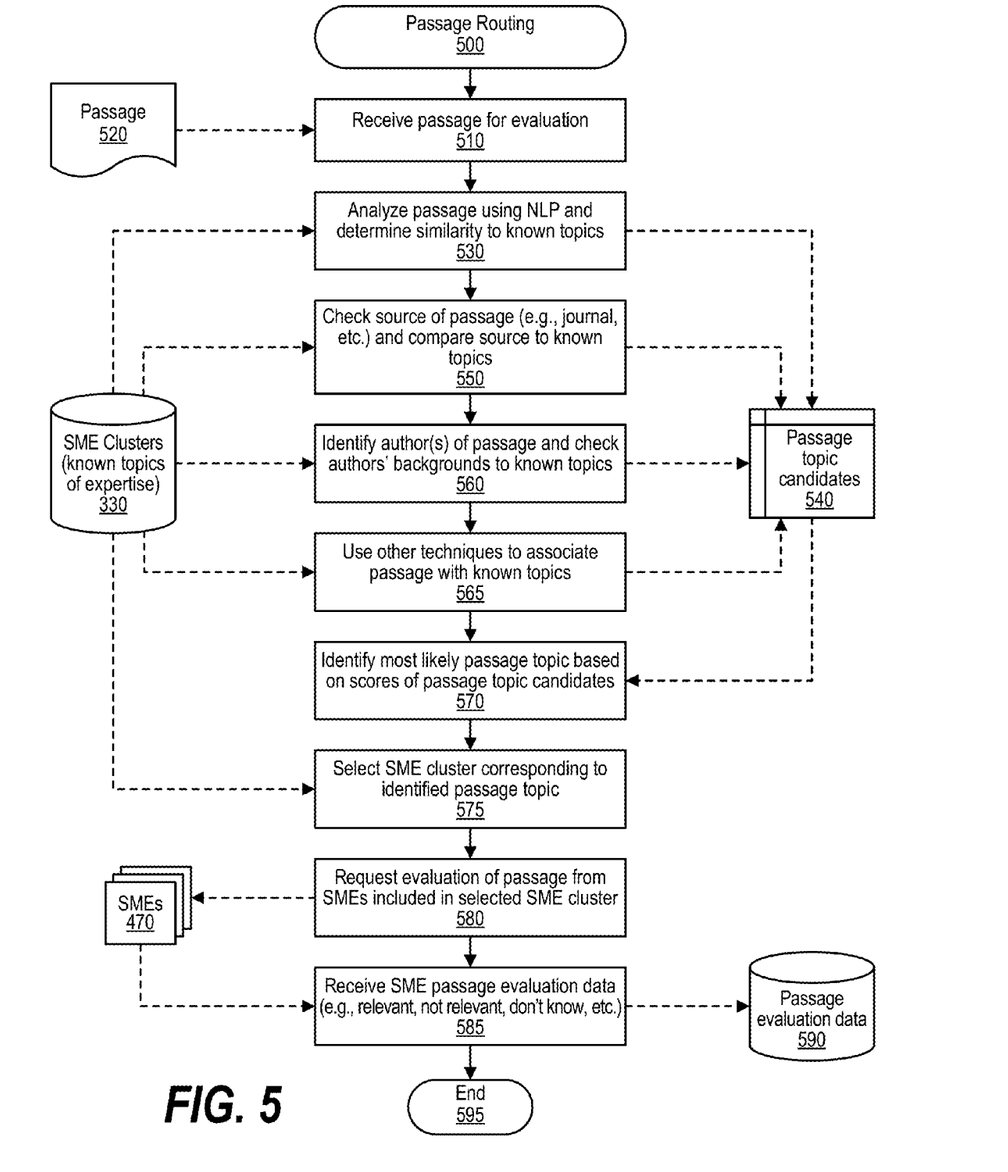
FIG. 5 is a depiction of a flowchart showing the logic performed in routing the passage to an appropriate set of Subject Matter Experts (SMEs)

FIG. 5 is a depiction of a flowchart showing the logic performed in routing the passage to an appropriate set of Subject Matter Experts (SMEs). Processing commences at 500 whereupon, at step 510, the process receives passage 520 for evaluation. At step 530, the process analyzes the passage using natural language processing (NLP) techniques to determine the passage's similarity to known topics. In one embodiment, known topics of expertise are stored in data store 330 with such topics of expertise corresponding to various SME clusters. Passage topic candidates, such as similarities to one or more defined SME clusters, are stored in memory area 540.

At step 550, the process checks the source of the passage (e.g., a particular journal, a web site, a newspaper column, etc.) and compares the source to known source topics. In one embodiment, known sources of topics of expertise are stored in data store 330 with such sources of topics corresponding to various SME clusters. Passage topic candidates, such as a match of a topic source pertaining to a defined SME cluster, are stored in memory area 540.

At step 560, the process identifies the author(s) of the passage and compares the author's backgrounds to known topics of expertise. For example, the author might be a professor of mechanical engineering, so an SME cluster pertaining to mechanical engineering might be a passage topic candidate. Such author topic/expertise matches are stored in memory area 540.

At step 565, any other techniques are used to associate the received passage with one or more known topics which are stored in memory area 540. After passage topic candidates have been stored in memory area 540, at step 570, the process identifies a most likely passage topic. In one embodiment, the identification of the most likely passage topic is based on scores computed for each of the candidates based upon how well a particular topic candidate matched the passage.

At step 575, the process selects the SME cluster that corresponds to the identified (most likely) passage topic. At step 580, the process requests evaluation of the received passage from the individual SMEs that are included in the selected SME cluster (SMEs 470). At step 585, the process receives passage evaluations from the SMEs that are included in the selected SME cluster. In one embodiment, as shown in FIG. 5, the passage evaluation uses question/answer pairs and asks the SMEs whether the passage is relevant given various question/answer pairs. The received passage evaluations are stored in data store 590. Passage routing processing thereafter ends at 595.

Figure 6:
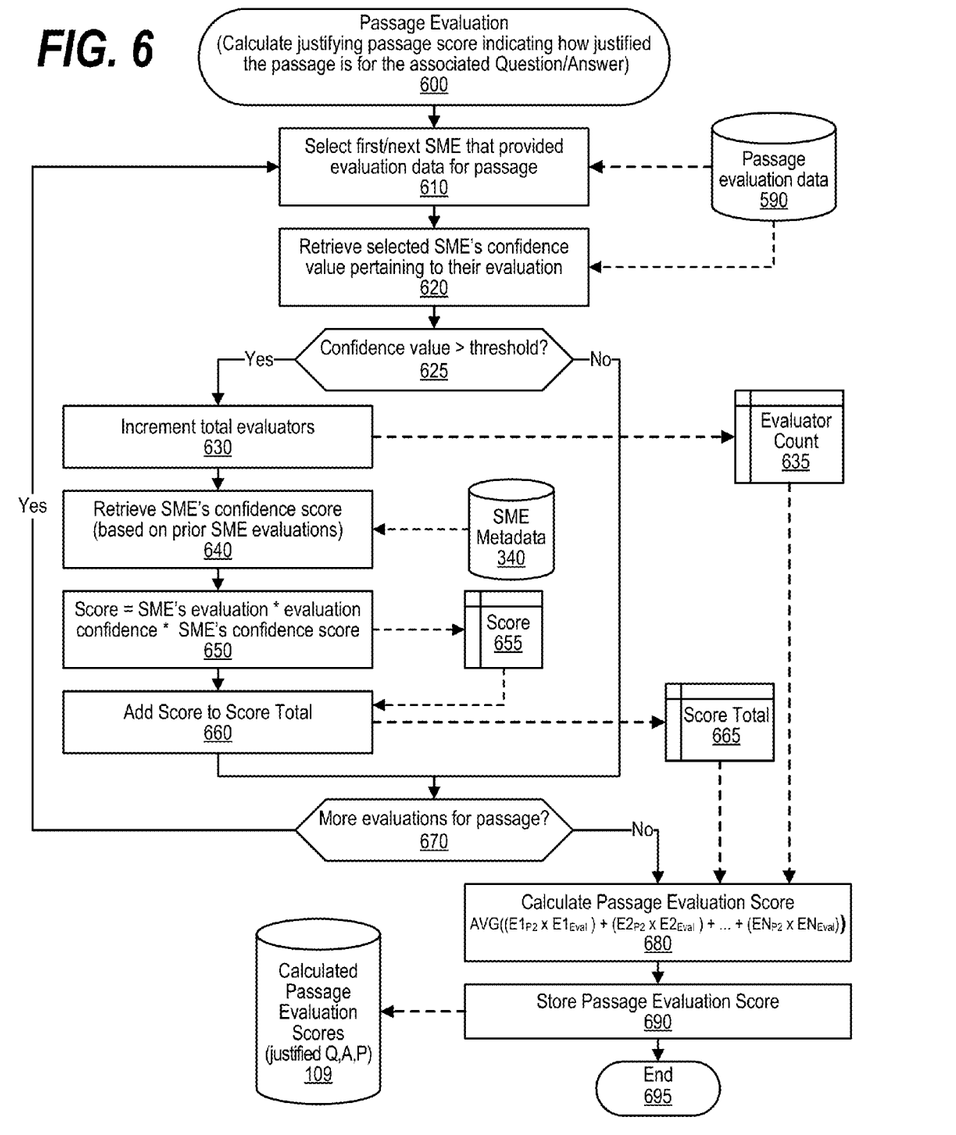
FIG. 6 is a depiction of a flowchart showing the logic used in evaluation of a passage by a set of Subject Matter Experts (SMEs)

FIG. 6 is a depiction of a flowchart showing the logic used in evaluation of a passage by a set of Subject Matter Experts (SMEs). The passage evaluation calculates a justifying passage score that indicates how justified the passage is for a question/answer pair. Processing commences at 600 whereupon, at step 610, the process selects the first SME that provided an evaluation for the passage with the evaluation being retrieved from data store 590. In one embodiment, an additional evaluation confidence value can be included with the evaluation by the SME with the evaluation confidence value indicating how confident the SME is with the evaluation. For example, using a one to ten scale with one being extremely unconfident and ten being extremely confident, the SME may indicate that the passage is "relevant" with an evaluation confidence value of nine, indicating that the SME is very confident that the passage is relevant to the question/answer pair. However, if the SME indicated an evaluation confidence value of one, such a value would indicate that the SME is not very confident in their assessment that the passage is relevant to the question/answer pair. Likewise, the SME may have indicated that the passage was "not related" to the question/answer pair with a corresponding evaluation confidence value indicating how confident the SME is with the "not relevant" evaluation.

Figure 7:
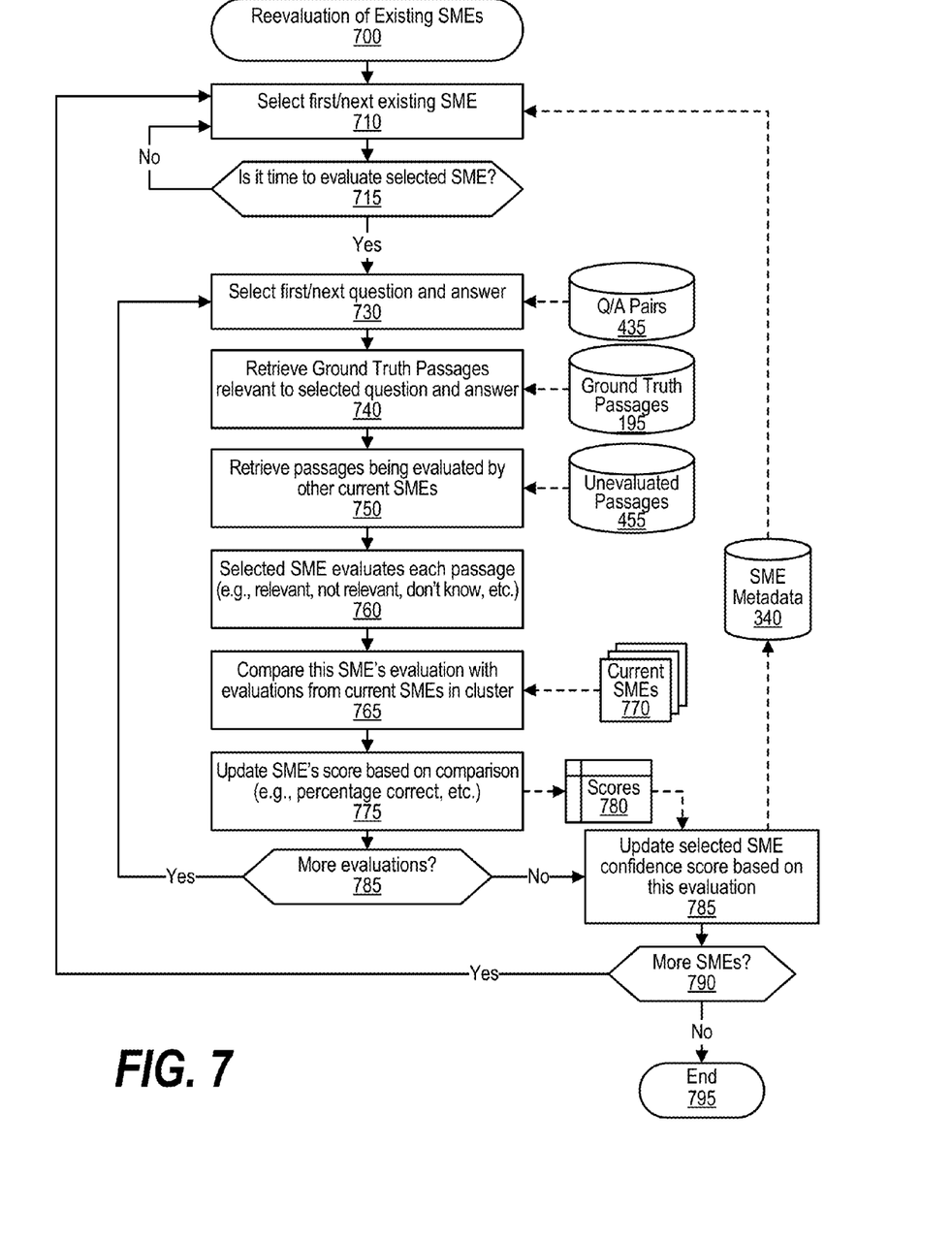
FIG. 7 is a depiction of a flowchart showing the logic performed in periodic reevaluation of existing Subject Matter Experts (SMEs)

In an embodiment utilizing an evaluation confidence value, such evaluation confidence value can be used to determine whether to use the SME's evaluation. In this embodiment, a determination (decision 625) is made as to whether the SME's evaluation confidence is greater than a threshold value (e.g., five, etc.). If the SME's evaluation confidence value is not greater than the threshold, then decision 625 branches to the "no" branch bypassing steps 630 through 660. On the other hand, if the SME's evaluation confidence value is greater than the threshold, then decision 625 branches to the "yes" branch whereupon, at step 630, the total number of evaluators (SMEs) for the passage is incremented with the incremented evaluator count stored in memory area 635. At step 640, the process retrieves the SME's confidence score from the SME's metadata which is stored in data store 340. As shown in FIGS. 4 and 7, the SME's confidence score is based on one or more evaluations of the SME's ability to correctly evaluate passages as being relevant to a question/answer pair.

At step 650, the process computes a score of the SME's evaluation of the passage which is stored in memory area 655. In one embodiment, the score is computed by weighting (e.g., multiplying, etc.) the SME's evaluation of the passage by the SME's evaluation confidence value and further weighted (e.g., multiplied, etc.) by the SME confidence score corresponding to this SME. At step 660, the computed score is added to the current total score which is stored in memory area 665.

A determination is made as to whether there are more evaluations that have been received for the passage (decision 670). If there are more evaluations for the passage, then decision 670 branches to the "yes" branch which loops back to select and process the next passage evaluation received from one of the SMEs as described above. This looping continues until there are no more evaluations for the passage, at which point decision 670 branches to the "no" branch.

At step 680, the process calculates a passage evaluation score for the passage. In one embodiment, the passage evaluation score is computed by taking an average of the total score. As shown, each of the scores entered for each of the SMEs is weighted by the SME's confidence score as well as the evaluation confidence value provided by the SME with the SME's evaluation of the passage. At step 690, the calculated passage evaluation score is stored in data store 109. The calculated passage evaluation scores provide a justified score given a question, answer, and passage. Passage evaluation processing thereafter ends at 695.

FIG. 7 is a depiction of a flowchart showing the logic performed in periodic reevaluation of existing Subject Matter Experts (SMEs). The processing shown in FIG. 7 is quite similar to the processing shown in FIG. 4. However, the logic of FIG. 4 is used to provide an initial evaluation of an SME, while the logic of FIG. 7 is used to periodically reevaluate an existing SME. Processing commences at 700 whereupon, at step 710, the process selects the first existing SME from data store 340. A determination is made as to whether it is time to reevaluate the selected SME (decision 715). For example, an SME might be evaluated monthly, every six months, etc. If it is not time to evaluate the selected SME, then decision 715 branches to the "no" branch which loops back to select the next SME. This looping continues until an SME is selected that is due to be reevaluated, at which point decision 715 branches to the "yes" branch to evaluate the SME.

At step 730, the process selects the first question/answer pair from data store 735. At step 740, the process retrieves one or more Ground Truth Passages that are relevant to the selected question/answer pair. These Ground Truth Passages are retrieved from data store 195. At step 750, the process retrieves previously unevaluated passages that are currently being evaluated by current SMEs, with each of the current SMEs having already been evaluated by the system and assigned an SME confidence score. The unevaluated passages are retrieved from data store 455.

At step 760, the process receives a set of one or more evaluations from the SME who is being evaluated. Each of the evaluations received from the selected SME pertains to one of the passages (either a Ground Truth Passage or a previously unevaluated passage). In one embodiment, the evaluation of a passage indicates whether the SME felt that the passage was relevant to the question/answer pair, was not relevant to the question/answer pair, or that the SME is unclear and did not know whether the passage was relevant to the question/answer pair. As shown in FIG. 6, the passage evaluation might also include an evaluation confidence score that indicates how confident the SME is with the evaluation.

At step 765, the process compares the selected SME's evaluations of the passages with evaluations received by the system from current SMEs 770 in the cluster. For example, the selected SME might have indicated that the passage was relevant to the question/answer pair, with the vast majority of SMEs agreeing that the passage was relevant, thus strengthening the system's confidence in the selected SME's ability to properly evaluate passages. Conversely, the selected SME might have indicated that the passage was not relevant to the question/answer pair, while the vast majority of SMEs indicated that the passage was relevant, thus weakening the system's confidence in the selected SME's ability to correctly evaluate passages. For Ground Truth Passages, the relevance of the passage has been previously established. If the selected SME indicates that a Ground Truth Passage is relevant, the SME's evaluation will serve to increase the SME confidence score pertaining to the SME. Conversely, if the selected SME indicates that a Ground Truth Passage is not relevant to the question/answer pair, the SME's evaluation will serve to decrease the SME confidence score pertaining to the SME. In addition, in one embodiment, if the selected SME is unsure of the relevance by indicating that he does not know the relevance, such lack of knowledge may be used to lower the SME's score. At step 775, the process generates a score based on the comparison of the selected SME's evaluation to the current SME's evaluation of a previously unevaluated passage or to an absolute relevance of a Ground Truth Passage. This score is stored in memory area 780. For example, a correct evaluation might receive ten points (+10), an incorrect evaluation might receive negative ten points (−10), and an unsure response where the selected SME indicated that he did not know whether the passage was relevant might receive negative five points (−5).

A determination is made as to whether there are more question/answer pairs to evaluate before generating an updated SME confidence score for the selected SME (decision 785). If there are more question/answer pairs to evaluate, then decision 785 branches to the "yes" branch whereupon processing loops back to step 730 to select the next question/answer pair and receive the selected SME's evaluations of passage(s) pertaining to the newly selected question/answer pair with scores for these evaluations being generated and stored in memory area 780. This looping continues until there are no more question/answer pairs to evaluate before updating the SME confidence score for the selected SME, at which point decision 785 branches to the "no" branch. At step 790, the process generates an updated SME confidence score for the selected SME which is stored as metadata pertaining to the selected SME in data store 340. In one embodiment, an average of the scores stored in memory area 780 is calculated. Other embodiments may provide greater weight for evaluations pertaining to Ground Truth Passages. Using the scoring system outlined above, if the selected SME's confidence score is near ten (e.g., 9.9, etc.), the system has a higher confidence in the selected SME's evaluations of passages as compared to an SME with a lower confidence score.

A determination is made as to whether there are more SMEs to select and possibly reevaluate (decision 792). If there are more SMEs to select and possibly reevaluate, then decision 792 branches to the "yes" branch which loops back to select and process the next SME. This looping continues until all SMEs have been selected, at which point decision 792 branches to the "no" branch and reevaluation processing ends at 795.

Figure 8:
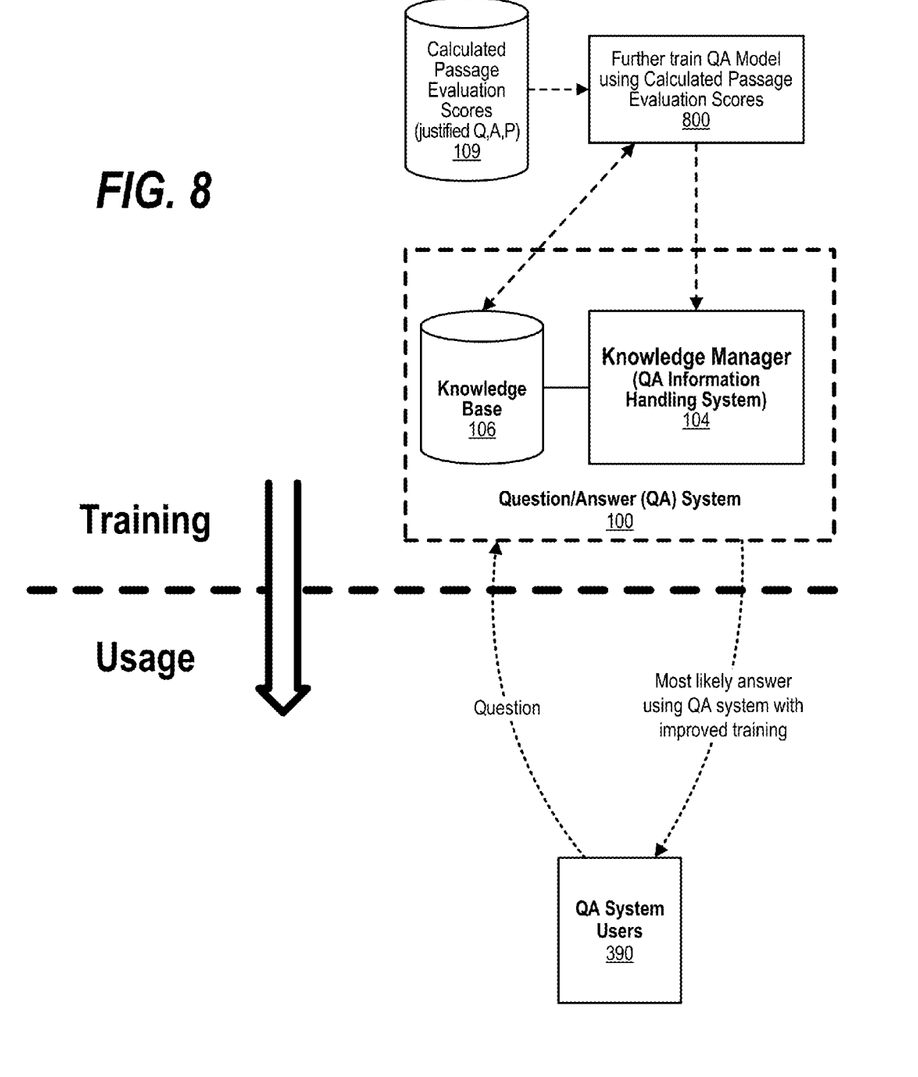
FIG. 8 is a diagram depicting training of the QA system using the justified passage scores and subsequent usage by a user.

FIG. 8 is a diagram depicting training of the QA system using the justified passage scores and subsequent usage by a user. Processing commences at 800 whereupon, at step 810, the QA system receives a question from user 390. Process 800 provides additional training of the QA system using calculated passage evaluation scores retrieved from data store 109. When training QA system 100, process 800 utilizes the calculated passage evaluation scores. Given a question, answer, and passage (Q,A,P), the passage evaluation score indicates whether the passage is relevant to the question-answer pair. As previously described, the passage evaluation score is based on evaluations received from Subject Matter Experts (SMEs). For example, if a passage has a high passage evaluation score, then the passage would be deemed more relevant to the question-answer pair than a passage with a lower passage evaluation score. Moreover, as previously explained, the individual SMEs are evaluated so passage evaluations received from SMEs achieving high individual confidence scores are weighted more highly than passage evaluations received from newer SMEs or from SMEs with lower confidence scores. The result of process 800 is an improved trained QA system 100.

After the model has been trained, questions are received from QA system users 390. QA system 100 processes the question, generates candidate answers, and selects the most likely answer that is returned to the user. Because the training of the model used by the QA system has been improved using the calculated passage evaluation scores from evaluated SMEs, the overall quality of likely answers returned by the QA system is improved.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
one or more processors;
a memory coupled to at least one of the processors;
a set of instructions stored in the memory and executed by at least one of the processors, wherein the set of instructions perform actions of:
receiving a plurality of responses at a question and answering (QA) system, wherein each of the responses includes an evaluation of a passage selected from a plurality of passages corresponding to a question and an answer, and wherein each of the responses is received from one of a plurality of subject matter experts (SMEs);
calculating a plurality of passage evaluation scores, each of the plurality of passage evaluation scores based on the received responses, wherein each of the passage evaluation scores correspond to a different one of the plurality of passages;
associating the plurality of passage evaluation scores to the question and the answer, wherein each of the passage evaluation scores signifies a relevance of one of the plurality of passages to the question and the answer; and
training a model utilized by the QA system, wherein the training is based in part on the plurality of passage evaluation scores associated with the question and the answer.

2. The information handling system of claim 1 wherein the actions further comprise:
identifying a selected one of the plurality of responses that was received from a selected one of the plurality of SMEs;
evaluating the selected response by comparing the selected response to the plurality of responses; and
updating, in the memory, a SME confidence score corresponding to the selected SME based on the evaluation.

3. The information handling system of claim 2 wherein the selected SME is a new SME, and wherein the actions further comprise:
including the new SME in an SME cluster of a plurality of SMEs with a common area of expertise;
receiving one or more of the plurality of responses from the selected SME and the plurality of SMEs included in the SME cluster;
evaluating the selected SME's responses by comparing the selected SME's responses to the responses received from other SMEs included in the SME cluster; and
wherein the updating of the SME confidence score includes initializing the SME confidence score corresponding to the selected SME based on the evaluation.

4. The information handling system of claim 2 wherein the selected SME is a previously evaluated SME, and wherein the actions further comprise:
receiving one or more of the plurality of responses from the selected SME and a plurality of SMEs included in a SME cluster;
evaluating the selected SME's responses by comparing the selected SME's responses to the responses received from other SMEs included in the SME cluster; and
wherein the updating of the SME confidence score includes initializing the SME confidence score corresponding to the selected SME based on the evaluation.

5. A computer program product stored in a non-transitory computer readable storage medium, comprising computer instructions that, when executed by an information handling system, causes the information handling system to perform actions comprising:
receiving a plurality of responses at a question and answering (QA) system, wherein each of the responses includes an evaluation of a passage selected from a plurality of passages corresponding to a question and an answer, and where each of the responses is received from one of a plurality of subject matter experts (SMEs);
calculating a plurality of passage evaluation scores, each of the plurality of passage evaluation scores based on the received responses, wherein each of the passage evaluation scores correspond to a different one of the plurality of passages;
associating the plurality of passage evaluation scores to the question and the answer, wherein each of the passage evaluation scores signifies a relevance of one of the plurality of passages to the question and the answer; and
training a model utilized by the QA system, wherein the training is based in part on the plurality of passage evaluation scores associated with the question and the answer.

6. The computer program product of claim 5 wherein the actions further comprise:
identifying a selected one of the plurality of responses that was received from a selected one of the plurality of SMEs;
evaluating the selected response by comparing the selected response to the plurality of responses; and
updating, in the memory, a SME confidence score corresponding to the selected SME based on the evaluation.

7. The computer program product of claim 6 wherein the selected SME is a new SME, and wherein the actions further comprise:
including the new SME in an SME cluster of a plurality of SMEs with a common area of expertise;
receiving one or more of the plurality of responses from the selected SME and the plurality of SMEs included in the SME cluster;
evaluating the selected SME's responses by comparing the selected SME's responses to the responses received from other SMEs included in the SME cluster; and
wherein the updating of the SME confidence score includes initializing the SME confidence score corresponding to the selected SME based on the evaluation.

8. The computer program product of claim 6 wherein the selected SME is a previously evaluated SME, and wherein the actions further comprise:
receiving one or more of the plurality of responses from the selected SME and a plurality of SMEs included in a SME cluster;

evaluating the selected SME's responses by comparing the selected SME's responses to the responses received from other SMEs included in the SME cluster; and wherein the updating of the SME confidence score includes initializing the SME confidence score corresponding to the selected SME based on the evaluation.

* * * * *